June 2, 1931. W. J. DADDYSMAN ET AL 1,808,495
VALVE
Filed April 19, 1927
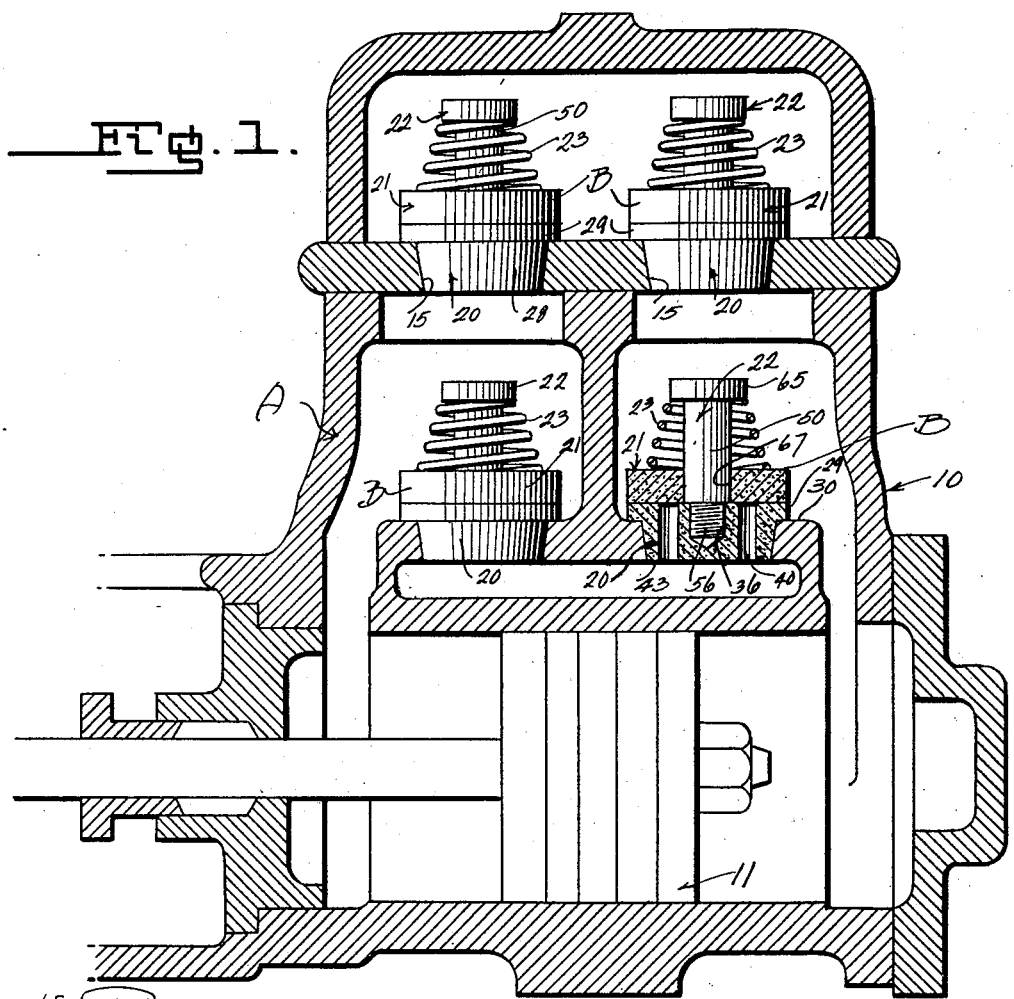
Fig. 1.
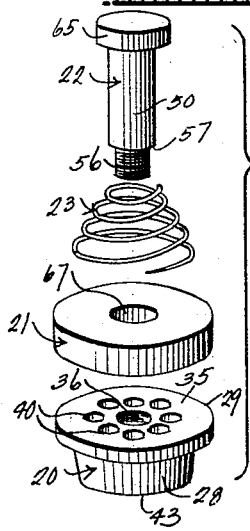
Fig. 2.
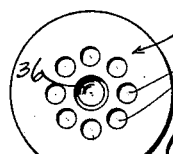
Fig. 3. William J. Daddysman
Alonzo F. Daddysman
Inventor Patented June 2, 1931

1,808,495

UNITED STATES PATENT OFFICE

WILLIAM J. DADDYSMAN AND ALONZO F. DADDYSMAN, OF CHARLESTON, WEST VIRGINIA

VALVE

Application filed April 19, 1927. Serial No. 184,960.

This invention relates to improvements in valves used under conditions where the same come into contact with acids, alkalis, and the like, such as would corrode and deteriorate metal valves and the like, the purpose of the invention being to provide a valve made of material which is highly resistant to any deterioration by contact with acids, alkalis, and hot liquids and gases.

The primary object of the invention is the provision of an improved valve construction, the principal parts of which are formed of ordinary graphite and another carbon such as coke in order to resist the deteriorating effects of acids, alkalis, and hot fluids, such as ordinarily deteriorate metal and rubber valves.

A further object of this invention is the provision of an improved valve construction including a valve seat, a valve member, and a guide stem formed of graphite and another carbon such as coke, and a metallic spring highly resistant to deteriorating influences of acids and alkalis; the improved valve construction being used in pumps, engines, and other apparatus where the fluid being operated upon or being used as an operating means including acids, alkalis, hot fluids, or other materials, liable to deteriorate ordinary metal valve details.

Other objects and advantages of this invention will be apparent during the course of the following detailed description.

In the accompanying drawings, forming a part of this specification, and wherein similar reference characters designate corresponding parts throughout the several views, Figure 1 is a vertical sectional view taken through a type of pump, adapted to pump chemicals, or the like, showing a plurality of the improved valve constructions as utilized thereon.

Figure 2 is a disassembled view showing the parts of the improved valve construction.

Figure 3 is a plan view of the improved valve seat of the valve construction.

In the drawings, wherein for the purpose of illustration is shown only a preferred embodiment of the invention, the letter A may generally designate a pump or other piece of machinery, in connection with which the improved valve construction B is adapted to be used.

While the apparatus A in connection with which the valve construction B is used, is shown in the drawing as a pump, the same may be other machinery, or mechanism, as can well be understood. The pump A in the illustration comprises a casing 10, having a piston 11 operating therein for the pumping of fluids, such as chemicals, which contain acids or alkalis, or other materials ordinarily harmful to metal valves. The pump may also be of the type adapted to operate upon very hot liquids which ordinarily deteriorate rubber valves or the like, since the improved valve construction B is adapted to be used in connection with mechanism conveying hot fluids. The relation of the valve construction B on the pump A is not important insofar as this invention is concerned, but in the illustration the pump A is of the double acting type, and the casing is provided with a plurality of sockets 15 tapered on a gradually restricted diameter towards the piston 11.

The valve construction B preferably comprises a seat 20; valve member 21; guide stem, member or pin 22 all of graphite and another carbon such as coke; and Monel metal spring 23.

As to the seat 20, the same includes a frusto-conical or tapered body 28, the upper portion of which is provided with a surrounding annular flange 29. The body portion 28 is adapted to seat in one of the tapered openings 15, with the flange 29 resting on the surface 30 of the casing 10 surrounding the tapered opening 15. This seat 20 may be held in any enclosed relation in the tapered opening 15, against unseating incident to pump operation. The body 28 is provided inwardly of the side thereof with a central screw threaded socket 36; the flange 29 being flush with the surface 35. Surrounding the screw threaded socket 36 are a plurality of ports 40, in an annular series about said screw threaded socket 36, it being noted from Figure 1 of the drawing that the screw threaded socket 36 terminates in a dead end in the body 28, but the ports 40 extend from the surface 35 of the body 28 to the opposite surface 43.

The guide pin or stem 22 rests in assembled relation on the seat 20, as is illustrated in Figure 1 of the drawing, and this valve stem or pin 22 includes the cylindrical shaped body portion 50, having the reduced screw threaded shank 56 on one end thereof, defining an annular shoulder 57 at the juncture of the shank 56 with the body 50. The shank 56 is adapted to be screw threaded into the screw threaded socket 36 so that the shoulder 57 comes to rest in a clamped relation upon the surface 35 of the valve seat 20, in the relation of parts illustrated in Figure 1. At the end of the body 50 opposite the screw threaded shank 56, is provided an annular spring retaining flange or head 65.

The valve 21 is of disc shaped formation, provided with a central opening 67 therethrough; the same being externally of the some diameter as the valve seat 20 at the flange 29; and the same having a face adapted to fit in a fluid sealed relation on the surface 35 of the valve seat construction 20. The opening 67 is of a diameter which will permit the sliding reception of the valve 21 upon the portion 50 of the guide pin or stem 22, and the function of the valve member 21 is of course to seal the ports 40 when seating on the valve seat 20, as illustrated in Figure 1 of the drawing.

As to the spring 23, the same is of a metal highly resistant to acid and alkali etc., such as Monel metal, the same being of spiral conical formation, having the lower larger end thereof adapted to seat upon the top surface of the valve disc or member 21, and the upper reduced end thereof fitting beneath the head or flange 65 of the valve stem or pin 22; the said spring being normally under a compression sufficient to force the valve disc or member 21 into a duct-sealed relation with the top of the valve seat 20, as is illustrated in Figure 1 of the drawing.

The operation of the valve construction B will of course be well understood by those skilled in the art to which this invention relates. It is to be noted, as a distinguishing characteristic of the carbon construction of the valve details, that the valve seat flange 29 is considerably thicker than the ordinary similar flange provided on a metal valve seat, and the valve disc or member 21 is approximately twice the thickness of the conventional metal valve disc. In similar manner the valve stem or pin 22 is sturdily constructed to withstand the operating forces thereon; the screw threaded shank 56 having very fine threads thereon, and the body portion 50 being relatively thicker than the similarly provided metal stem, and the flanged head 65, much smaller in diameter than any similar metal head.

As to the valve details 20, 21 and 22, the same are formed of amorphous carbon, such as coke, with the crystalline form of carbon known as graphite, of the proper proportions to give sufficient tensile strength. The ingredients may be bonded into an integral mass under proper heat treatment and by the use of a suitable binder. As an example, the ingredients may be intimately mixed in dry form, a small amount of some organic binder added, such as molasses, and, after moulding into the desired shape, may be fired at a temperature sufficient to char the binder. The preferred proportions of the ingredients are 60 parts of carbon coke to 40 parts of ordinary graphite, although this proportion of parts may be varied; it of course being understood that the valve parts 20, 21 and 22 are rigid and non-flexible, and wear resistant.

The parts of this valve construction are so formed and proportioned that they may withstand high pressures to which they are sometimes subjected.

Various changes in the shape, size, arrangement of parts, and proportion of ingredients of the valve details may be made to the invention herein shown and described, without departing from the spirit of the invention or the scope of the claims.

We claim:

1. An acid and alkali carbon resisting valve construction comprising a valve seat composed of graphite and coke, a valve member composed of graphite and coke, a guide stem of graphite and coke rigid with the seat for guiding the opening or closing relation of the valve member with respect to the seat.

2. An acid and alkali carbon resisting valve construction comprising a valve seat composed of graphite and coke, valve member composed of graphite and coke, a guide stem of graphite and coke rigid with the seat for guiding the opening or closing relation of the valve member with respect to the seat, and a metal spring operating on the valve member to normally close the same upon the valve seat.

3. In a valve construction of the class described the combination of a valve seat composed of graphite and coke having a port therethrough, a guide stem composed of graphite and coke, rigid with the seat, a valve disc composed of graphite and coke slidable on the stem for opening and closing the port of said seat, and a metal spring under compression between the stem and valve disc for seating the latter in a closing relation over the port of said seat.

4. In a valve construction of the class described a valve seat composed of graphite and coke having a transverse eccentric port therethrough and a substantially central screw threaded socket, a guide stem composed of graphite and coke detachably threaded in said screw threaded socket, and a valve member composed of graphite and coke slidable on the stem for opening and closing said port.

5. In a valve construction of the class described a valve seat composed of graphite and coke having a transverse eccentric port therethrough and a substantially central screw threaded socket, a guide stem composed of graphite and coke detachably threaded in said screw threaded socket, a valve member composed of graphite and coke slidable on the stem for opening and closing said port, and spring means associated with said stem and operating on the valve member to force the same in a closing relation on the port of said valve seat.

6. In a valve construction the combination of a seat composed of graphite and coke providing a tapered body having an annular flange at the larger end thereof, said body centrally thereof, opening at the end on which the flange is provided, having a screw threaded socket, said valve seat surrounding the socket having a series of transverse port openings therethrough, a pin composed of graphite and coke having a reduced screw threaded shank with an annular shoulder at its juncture thereof with the pin, said pin at the end thereof opposite the shank having an annular flange, said screw threaded shank being adapted to detachably engage in the threaded socket of the seat, a flat valve member composed of graphite and coke having an opening therethrough slidably disposed on the body portion of the pin, and a frusto-conical shaped spring of Monel metal under compression between the valve member and the flange of the pin forcing the valve member into a closing relation on said ports.

WILLIAM J. DADDYSMAN.
ALONZO F. DADDYSMAN.